July 6, 1954
V. E. MATULAITIS
2,683,025
HEAT TRANSFER APPARATUS
Filed July 28, 1949
3 Sheets-Sheet 3
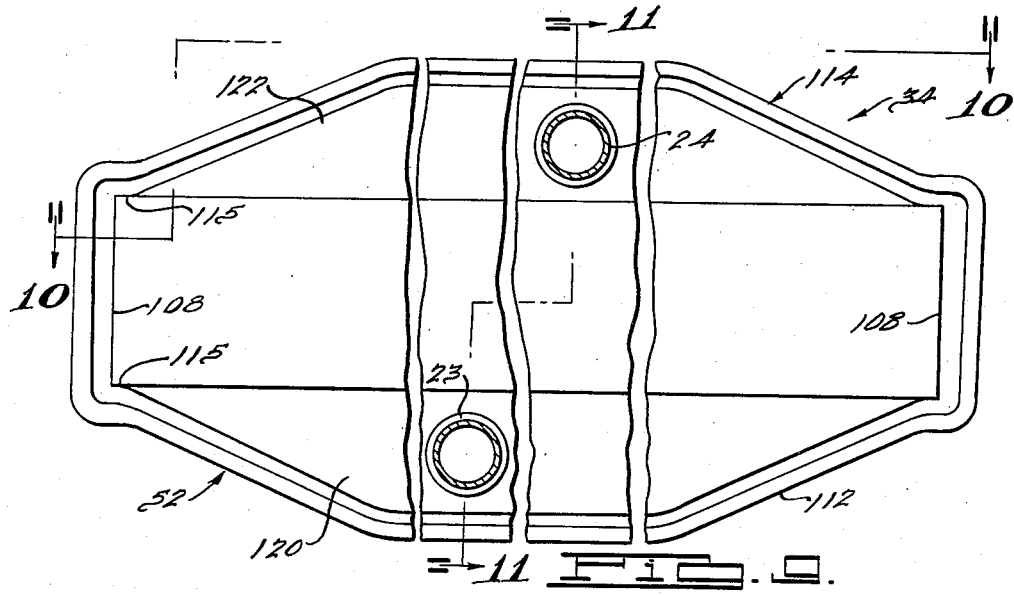
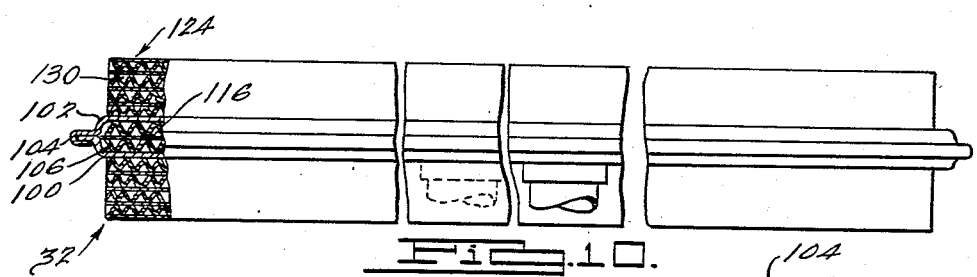
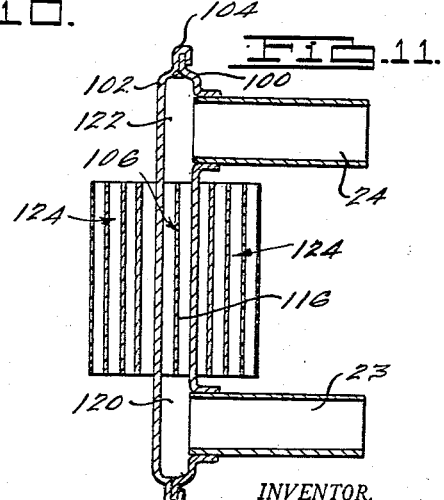
INVENTOR.
Victor E. Matulaitis
BY
Harness, Dickey & Pierce
ATTORNEYS.

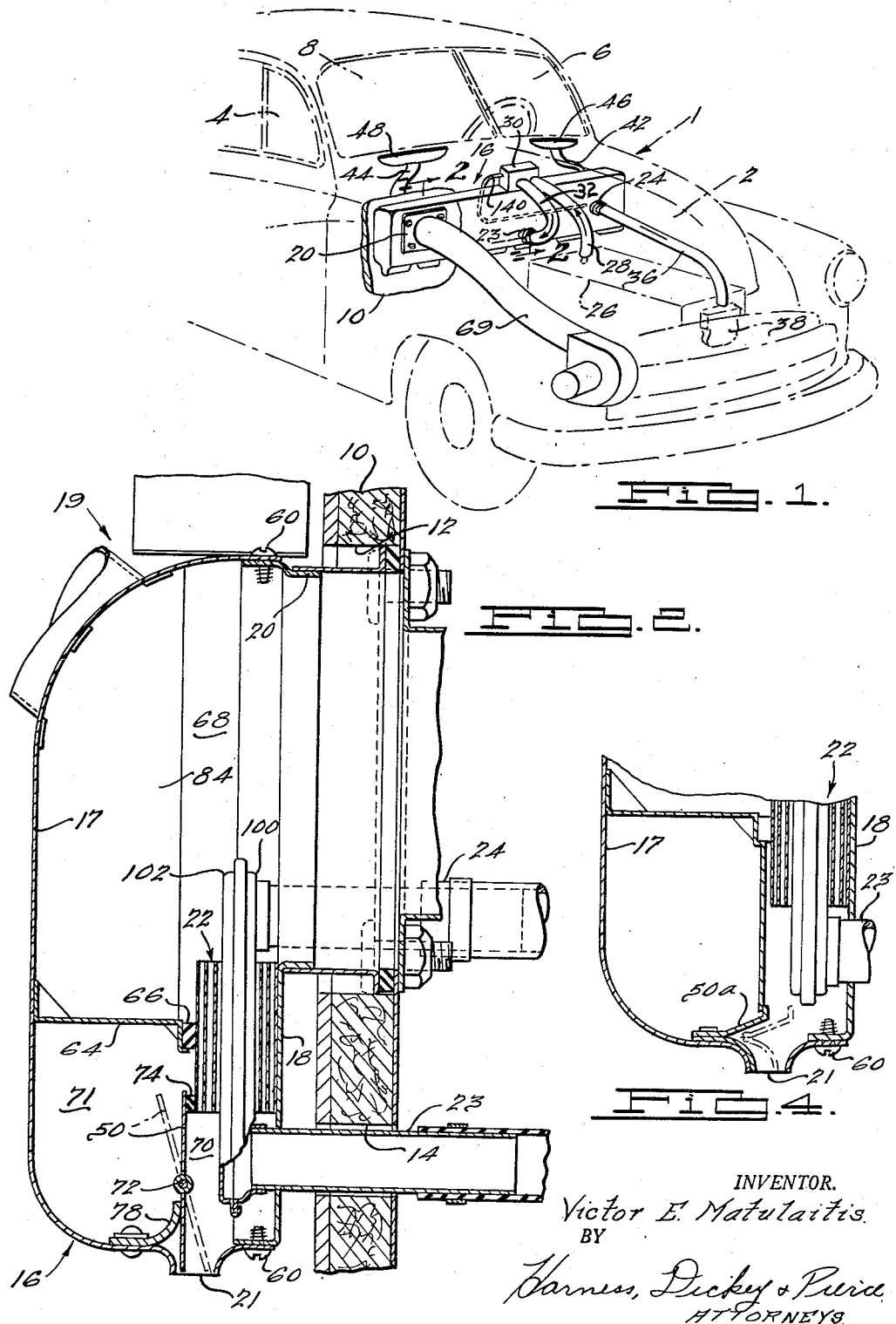

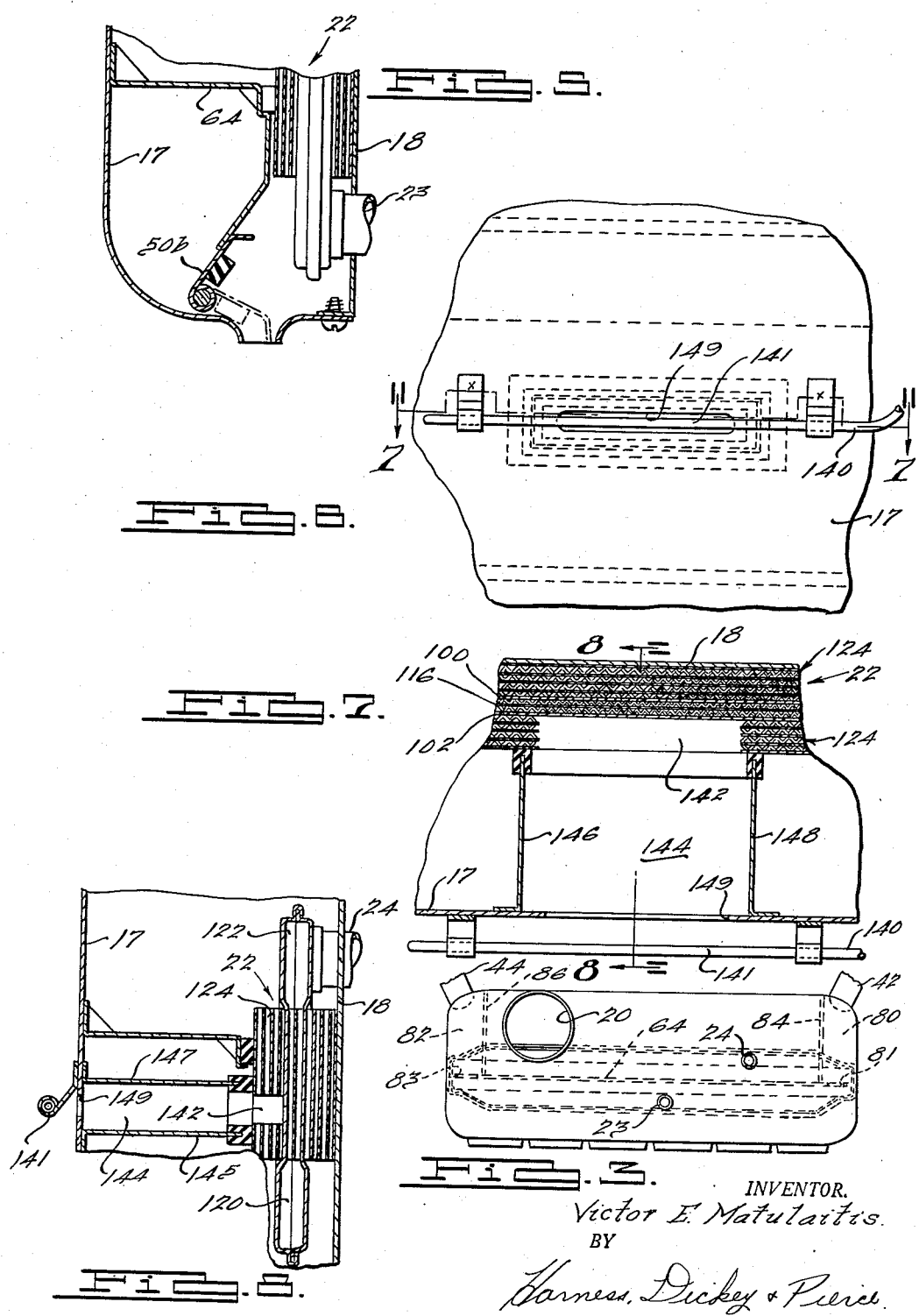

Patented July 6, 1954

UNITED STATES PATENT OFFICE 2,683,025

2,683,025

HEAT TRANSFER APPARATUS

Victor E. Matulaitis, Detroit, Mich.

Application July 28, 1949, Serial No. 107,332

1 Claim. (Cl. 257—256)

This invention relates generally to heat transfer apparatus and is particularly adapted among other uses in locations in which a heat transfer surface having an unusually large aspect ratio is desired, for example, in heaters for automobiles.

In the last few years, it has become increasingly apparent that for greater comfort the motor vehicle should be heated by supplying warm air thereto completely across the vehicle. Some steps have been taken along this line in an endeavor to provide such a heated air distribution. Presently such distribution is provided by means of a duct located back of the motor vehicle instrument panel and extending substantially completely across the motor vehicle. A present practice is to provide a core at one side of the motor vehicle either within the engine compartment or within the motor vehicle closely adjacent the fire wall to heat the air which is then discharged into a transversely extending plenum chamber or duct having downwardly spaced openings for distributing, as evenly as possible, the heated air across the motor vehicle.

This type of installation has been somewhat satisfactory but has had certain disadvantages in that the space in back of the instrument panel is quite limited due to the present day tendency to provide not only instruments thereon but also a glove compartment on the passenger side of of the vehicle and a radio in the central portion. This makes it very hard to find sufficient room to place a core or other heat transferring surface to heat the air supplied to the duct. Also in view of modern day construction space within the engine compartment adjacent the fire wall is at a premium and space on this side of the fire wall to locate the necessary heat exchange surface has been attained only by a sacrifice of space for other desired instrumentalities associated with a motor vehicle.

Furthermore, attempts have ben made to provide a core within the distributing duct so that the lumped heat exchange surface now presently used could be eliminated. These attempts have met with little success especially with those types of heaters provided with thermostatic control for regulating the amount of heating fluid supplied to the heater. Normal heat exchange surfaces of the type used in motor vehicles provide for the flow of hot water or heated fluid transverse to the flow of air to be heated. In order to provide a heat exchange surface of sufficient capacity for the modern vehicle in colder weather and to remain within space limitations, it has been necessary to provide small water passageways and extended area surfaces associated therewith through which the air to be heated is passed. These passageways of necessity must be of sufficient size so that when the maximum amount of hot water for heating is required, the passageways will permit such hot water flow. When, however, the temperature moderates so that the control valve throttles the flow of hot water, it has been found that with such a heat exchange surface in the long narrow duct that the air passed adjacent the hot water inlet side of the heat exchange surface is heated higher than desired while the air passing through the opposite end has been heated relatively little if at all.

It is accordingly an object of my invention to provide improved heat transfer apparatus comprising an elongated casing having straight side and end edges and diagonal corners, a fin structure extending between the end edges, portions of the casing above and below the fin structure being shaped outwardly to provide enlarged header portions.

Another object of this invention is to provide an extremely efficient heat exchange surface of the type described which requires a very small amount of space with respect to the heat transfer.

A further object of this invention is to provide a relatively rigid dividing wall separating the fluid medium supplying the heat from the fluid medium which is to be heated.

Another object of this invention is to provide extended area surface on each side of this relatively rigid massive wall.

Another object is to utilize the extended surface for reinforcing the dividing wall.

Other objects of this invention will be apparent from the specification, the appended claim and from the drawings, in which drawings, Figure 1 is a perspective diagrammatic partial view of a motor vehicle equipped with a heater embodying the invention;

Fig. 2 is an enlarged view of the heater taken substantially along the line 2—2 of Fig. 1;

Fig. 3 is a side view of the heater of Fig. 2;

Fig. 4 is a fragmentary view showing a modified form of the heater shown in Fig. 2;

Fig. 5 is a view similar to Fig. 4 showing a further modified form of the heater;

Fig. 6 is a fragmentary left side view of the heater shown in Fig. 2 and showing a portion of the temperature control arrangement for the controlling flow of heating fluid to the heater;

Fig. 7 is a view taken substantially along the line 7—7 of Fig. 6;

Fig. 8 is a view taken substantially along the line 8—8 of Fig. 7;

Fig. 9 is a detailed broken view showing certain of the internal features of the heat transfer core for the heater shown in Fig. 2;

Fig. 10 is a view taken substantially along the line 10—10 of Fig. 9;

Fig. 11 is a view taken substantially along the line 11—11 of Fig. 9.

Referring to the drawings by characters of reference, the numeral 1 indicates generally a portion of a motor vehicle having an engine compartment 2, a passenger space 4, windshield portions 6 and 8 and a fire wall 10. The fire wall 10 is provided with a suitable number of apertures, some of which are shown at 12 and 14 for mounting a motor vehicle heater generally designated 16 and which as shown extends transversely of the vehicle and substantially completely across the width thereof. The heater 16 comprises a dished sheet metal member 17 having a peripheral wall closed by a substantially planar sheet metal piece 18 to form a boxlike member or housing 19 having adjacent one end thereof an air inlet 20 and a series of downwardly opening elongated air discharge passageways 21 across the length of the heater. The inlet 20 may be positioned anywhere along the length of the heater 16. A core 22 is carried within the housing 19 and is provided with an inlet 23 and outlet 24 for flow of heat supplying medium. Such medium in a motor vehicle may be the coolant used for the motor vehicle engine.

The coolant preferably is supplied from the engine 26 through a conduit 28, through a flow controlling thermostatic device 30, and conduit 32 to the heater inlet 23. The coolant after flowing through the core 22 passes outwardly through the outlet 24 and conduit 36 back to the motor vehicle cooling system, as, for example, to the coolant pump 38.

Air for defrosting the windshields 6 and 8 is distributed thereto through conduits 42 and 44 and nozzles 46 and 48 respectively. The flow of air to the vehicle and for defrosting is controlled by a damper 50, 50a or 50b depending upon the particular arrangement which is being considered.

The core structure 22 is located adjacent the front wall 18 of the sheet metal housing 19 and spaced slightly upwardly from the lower edge thereof. A transversely extending wall 64 is provided substantially midway of the core 22 and extends between the rear wall portion of the sheet metal member 17 and the core 22, the joint between the transverse wall 64 and the core 22 being sealed by suitable resilient sealing material 66. The wall 64 and core 22 cooperate with the housing 19 to provide an inlet plenum chamber 68 which is supplied with air from a conduit or duct 69 connected to the inlet 20. The air admitted through the inlet 20 distributes itself substantially equally from end-to-end of the heater 16 for flow downwardly through the core 22 into a lower plenum or distributing chamber 70. The chamber 70 is in selective communication with the elongated fluid distributing slots 21 and with a chamber 71 separated from the chamber 70 by the damper 50.

In the form shown in Fig. 2 the damper 50 is of the butterfly type and is pivotally supported on a shaft 72 journaled in the housing 19. In the position of the damper 50 shown in full lines, its upper end engages a resilient sealing member 74 similar to the member 66 for completely shutting off flow of air between the chamber 70 and the defrosting air distributing chamber 71 whereby all the air passing through the core 22 is discharged from the plenum chamber 70 through the outlets 21 for heating the interior of the motor vehicle. Additional sealing means such as a flexible strip 78 is provided to abut against the lower half of the butterfly damper or valve 50 and to follow the rotative movement of the damper 50 so that flow of air from the chamber 71 outwardly through the outlets 21 is prevented. The damper 50 may be rotatively positioned as desired by means of a crank arm or other suitable means, not shown, for rotating the shaft 72.

Positioning of the damper 50, in the dash line position thereof as shown in Fig. 2, restricts the flow of air outwardly through the outlets 21 and opens a fluid flow path between the chambers 70 and 71 for causing air to flow from the chamber 70 into the chamber 71 for flow upwardly through vertically extending passageways 80 and 82 located at opposite ends of the heater 16. The passageways 80 and 82 communicate with the chamber 71 through apertures 81 and 83 respectively in the wall 64. The conduits 42 and 44 are in respective open communication with the upper end of these passageways 80 and 82. The defrosting air passes outwardly through the conduits 42 and 44 and the distributors 46 and 48 for flow across the windshield portions 6 and 8. L-shaped vertically extending sheet members 84 and 86 extend upwardly from the top surface of the transverse member 64 and seat against the adjacent inwardly curved portions of the member 17 to separate the passageways 80 and 82 from the chamber 68.

Referring now more specifically to Figs. 9, 10 and 11, the core 22 comprises a pair of dished sheet metal members 100 and 102 which are arranged in face-to-face relation and have their peripheral edges secured together as by the flange 104 of the member 102 to provide an inner chamber 106 for containing the heat supplying medium. The members 100 and 102 preferably are relatively thick to provide both strength and sufficient thickness so that slight imperfections in its surfaces or corrosion will not permit the coolant to flow outwardly of the chamber 106. The dished members 100 and 102 have spaced substantially parallel vertical extending end walls 108 interconnected by offset similar top and bottom walls 112 and 114. The walls 112 and 114 at their intersection with the walls 108 form upper and lower shoulders 115 for mechanically holding the internal extended heat transfer surface 116. The surface 116 occupies a substantially rectangular space within the chamber 106 which is of a height equal to the distance between the shoulders 115 and of a length equal to the distance between the walls 108. The offset of the walls 112 and 114 provides a lower inlet distributing chamber 120 and an upper outlet distributing chamber 122 which communicate respectively with the inlet and outlet conduits 23 and 24. In this manner water admitted through the inlet 23 will disperse itself throughout the chamber 120 for substantially equal flow upwardly through the extended surface 116 into the outlet chamber 122 where it is collected and discharged outwardly through the outlet 24. An external extended area surface 124 is provided in good thermal contact with the outer surface of each of the members 100 and 102.

In Fig. 1 of the drawings, there is shown a thermostatic flow controlling device 30 for regulating the flow of heating fluid to the chamber 106. This device 30 is controlled by means of an expansible, contractible fluid located within a small bore tube 140 which extends outwardly from the control device 30 to provide a tube portion 141 at the back of the heater 16. The tube 140 also has a portion responsive to the temperature within the motor vehicle. The quantity of control fluid in the conduit 140 is proportioned such that within the operating temperature range of the device 30 only a small quantity of fluid in liquid form will be present in the conduit 140. Therefore, the coldest section of conduit 140 will act as the control temperature for the thermostatic device 30.

The thermostatic device 30 is provided with a valve mechanism, not shown, which regulates the flow of coolant to the core 22 in accordance with the coldest temperature to which any section of the capillary control tube 140 is subjected. Controls of this type are available in the open market and a more detailed description thereof is not deemed necessary. I propose, however, to associate the device 30 in a novel manner with the heater 16 to provide for an improved temperature regulation. More specifically the arrangement provides for preventing the device from reducing the flow of engine coolant to the heater sufficiently to permit air to be supplied to the vehicle which is substantially below the desired temperature of the vehicle. To do this, I provide for bypassing a portion of air which has partially been heated by the core 22 over the portion 141 of the tube 140 so that when the temperature of this partially heated air is below the desired vehicle temperature then the control of the device 30 will be in accordance with the temperature of the partially heated air rather than as occurs under other conditions of operation under control of a second section of the tube 140 which is responsive to vehicle temperature.

To provide for this partially heated air the extended surface 124 adjacent the lower end portions of the passageways 130 is cut away to provide a pocket 142 which opens outwardly into a passageway 144 formed between sheet members 145, 146, 147 and 148 extending between the surface 124 and the rear wall of the dished member 17. An aperture 149 in the member 17 permits a limited amount of air to flow outwardly of the chamber 144 and across the tube portion 141.

During operation of the heater 16 when the vehicle temperature is below the desired temperature, the device 30 will be permitting engine coolant to flow through the core 22 in sufficient quantity to raise the temperature of the air admitted through the inlet 20 to a temperature above that within the vehicle. During this operation the air passing outwardly of the core 22 into the passageway 144 and outwardly through the aperture 149 will be heated to a temperature just slightly below the temperature of the air being discharged through the outlets 21 and will be at a temperature above the temperature of the vehicle and will not be able to control the device 30 since a second portion of the tube 140 responsive to vehicle temperature will be at a lower temperature and will control.

As the temperature of the vehicle approaches the desired temperature the device 30 will act to reduce the flow of engine coolant to the core 22 and as a result the temperature of the air discharging outwardly of the passageways 21 will drop as well as the temperature of the air discharging through the aperture 149. Before the temperature of the air passing outwardly of the aperture 21 is reduced sufficiently to be objectionable to the occupants of the vehicle the temperature of the air passing outwardly of the aperture 149 will have decreased to cause the tube portion 141 to be the control point of the tube. As a consequence of the change in control to the portion 141 the device 30 will then be actuated to increase the flow of engine coolant to the core 22 to maintain the temperature of the portion 141 at the desired vehicle temperature and cold air will be prevented from entering the vehicle.

With the use of counterflow heating of the air as shown, throttling of the flow of engine coolant through the core will cause an increase in the differential in temperature between that of the air flowing across the portion 141 and that flowing outwardly of the apertures 21 which still further aids in shifting of the control point for the device 30 to prevent a flow of objectionable air outwardly of the apertures 21. In passing, it is well to point out that in the absence of such a control arrangement the device 30 might reduce the flow of engine coolant to the core 22 such that the air flowing from the heater into the vehicle actually was substantially cooler than that desired. Until the temperature of the vehicle was lowered by such air to a temperature below that desired the control 30 would not act to increase the flow of heating fluid to the core 22. This would result in a chilling effect on the occupants of the vehicle which is undesirable. With the arrangement described herein such flow of cold air is prevented and at no time can such a flow chill the occupants. Neither will the heater act to overheat the vehicle since the relative temperatures of the air leaving the apertures 21 and 149 will act to control the temperature of the air discharged through the apertures 21 slightly above the desired temperature which will neither cause an uncomfortable increase in the vehicle temperature nor permit a chilling air flow which would be objectionable.

What is claimed and is desired to be secured by United States Letters Patent is as follows:

A heat transfer core comprising a casing consisting of a pair of elongated sheet metal members having straight elongated side edges, straight elongated end edges, and straight inclined corner edges connecting the ends of said side edges with the ends of said end edges, said members having continuous peripheral flanges extending toward each other and spacing the sides of said casing apart, the peripheral flanges at the intersection of said end edges and said inclined edges providing internal supports, thin elongated heat transfer fin structure of overall rectangular block shape extending from end to end of said casing and having its end corners engaged and located by said internal supports, the sides of said fin structure engaging the inner surfaces of said members, and the edges of said structure occupying planes connecting corresponding end edges of said members leaving header spaces beyond opposite edges of said fin structure, the portions of said members located outwardly toward the side edges from lines joining the corresponding end edges thereof being shaped outwardly beyond the intermediate portions thereof to form transversely widened header spaces, one of said members having inlet and outlet openings formed therein inwardly from its edges and communicating with said header spaces.

References Cited in the file of this patent

UNITED STATES PATENTS

| Number | Name | Date |
|---|---|---|
| 1,693,618 | Otis | Dec. 4, 1928 |
| 1,775,173 | Phelps et al. | Sept. 9, 1930 |
| 1,899,080 | Dalgliesh | Feb. 28, 1933 |
| 1,966,882 | Bucklen | July 17, 1934 |
| 2,136,641 | Smith | Nov. 15, 1938 |
| 2,213,018 | Perkins | Aug. 27, 1940 |
| 2,247,199 | Kritzer | June 24, 1941 |
| 2,247,405 | Raney | July 1, 1941 |
| 2,300,357 | Hans | Oct. 27, 1942 |
| 2,309,202 | Moore | Jan. 26, 1943 |
| 2,360,123 | Gerstung et al. | Oct. 10, 1944 |
| 2,376,749 | Belaieff | May 22, 1945 |
| 2,490,919 | Raney | Dec. 13, 1949 |
| 2,526,135 | Holmes et al. | Oct. 17, 1950 |
| 2,542,317 | Faulhaber et al. | Feb. 20, 1951 |
| 2,544,465 | Matulaitis | Mar. 6, 1951 |